United States Patent [19]
Schwartz et al.

[11] Patent Number: 6,119,939
[45] Date of Patent: Sep. 19, 2000

[54] OPTICAL ASSEMBLY FOR BARCODE SCANNER

[75] Inventors: Eric D. Schwartz; Edward B. Hubben, both of Skaneateles; Brian L. Jovanovski, Syracuse; Vivian L. Hunter, Baldwinsville; Melvin D. McCall, Homer, all of N.Y.

[73] Assignee: Welch Allyn, Inc., Skaneateles Falls, N.Y.

[21] Appl. No.: 09/111,476

[22] Filed: Jul. 8, 1998

[51] Int. Cl.⁷ .................................................. G06K 7/10
[52] U.S. Cl. .................. 235/462.01; 235/454; 235/470; 235/468; 235/472.01
[58] Field of Search .................................. 235/454, 470, 235/468, 462.01, 455, 472, 440

[56] References Cited

U.S. PATENT DOCUMENTS

| | | | |
|---|---|---|---|
| 4,315,245 | 2/1982 | Nakahara et al. | 340/146.3 |
| 4,408,120 | 10/1983 | Hara et al. | 235/462.01 |
| 4,516,017 | 5/1985 | Hara et al. | 235/472 |
| 4,538,072 | 8/1985 | Immler et al. | 250/568 |
| 4,591,706 | 5/1986 | Sims | 235/454 |
| 4,804,949 | 2/1989 | Faulkerson | 340/710 |
| 4,816,659 | 3/1989 | Bianco et al. | 235/462.01 |
| 4,866,258 | 9/1989 | Ueda et al. | 235/472 |
| 4,900,907 | 2/1990 | Matusima et al. | 235/472 |
| 5,280,161 | 1/1994 | Niwa | 235/462.01 |
| 5,283,699 | 2/1994 | Komai et al. | 359/896 |
| 5,291,009 | 3/1994 | Roustaei | 235/472 |
| 5,291,028 | 3/1994 | Droge et al. | 250/568 |
| 5,349,172 | 9/1994 | Roustaei | 235/472 |
| 5,354,977 | 10/1994 | Roustaei | 235/472 |
| 5,359,185 | 10/1994 | Hanson | 235/472 |
| 5,463,213 | 10/1995 | Honda | 235/468 |
| 5,468,950 | 11/1995 | Hanson | 235/472 |
| 5,477,044 | 12/1995 | Aragon | 235/472 |
| 5,484,994 | 1/1996 | Roustaei | 235/462.01 |
| 5,486,688 | 1/1996 | Iima et al. | 235/462.01 |
| 5,504,317 | 4/1996 | Takahashi | 235/462.01 |
| 5,504,367 | 4/1996 | Arackellian et al. | 235/472 |
| 5,532,467 | 7/1996 | Roustaei | 235/472 |
| 5,574,272 | 11/1996 | Seo et al. | 235/454 |
| 5,591,955 | 1/1997 | Laser | 235/472 |
| 5,598,007 | 1/1997 | Bunce et al. | 250/566 |
| 5,600,116 | 2/1997 | Seo et al. | 235/455 |
| 5,600,121 | 2/1997 | Kahn et al. | 235/472 |
| 5,602,379 | 2/1997 | Uchimura et al. | 235/472 |
| 5,684,290 | 11/1997 | Arackellian et al. | 235/472 |
| 5,689,104 | 11/1997 | Suzuki et al. | 235/472 |
| 5,697,699 | 12/1997 | Seo et al. | 362/252 |
| 5,703,348 | 12/1997 | Suzuki et al. | 235/472 |
| 5,744,791 | 4/1998 | Isaac et al. | 235/472 |
| 5,747,787 | 5/1998 | Shin et al. | 235/472 |
| 5,750,977 | 5/1998 | Suzuki | 235/472 |
| 5,756,981 | 5/1998 | Roustaei et al. | 235/472 |
| 5,786,582 | 12/1995 | Roustaei et al. | 235/462.01 |

*Primary Examiner*—Michael G Lee
*Assistant Examiner*—Daniel S Felten
*Attorney, Agent, or Firm*—Wall Marjama Bilinski & Burr

[57] ABSTRACT

The invention is optical assembly for use in a barcode reader that includes a frame having a rear housing and a pair of arms outwardly extended from the housing. An optical card containing an imaging lens is slidably received in a rear guideway situated between the arms. An aperture card is slidably received in a front guideway situated between the arms in front of the lens. Lamp support brackets are also mounted to either side of the arms. Each bracket contains a pair of LEDs that are aligned in coplanar relation with the imaging lens. A cylindrical lens is mounted in front of the lamp support brackets within the arms of the frame to magnify and focus the illumination from the LED upon a target in barcode space. A horizontally extended field stop aperture is positioned in front of each LED.

10 Claims, 3 Drawing Sheets

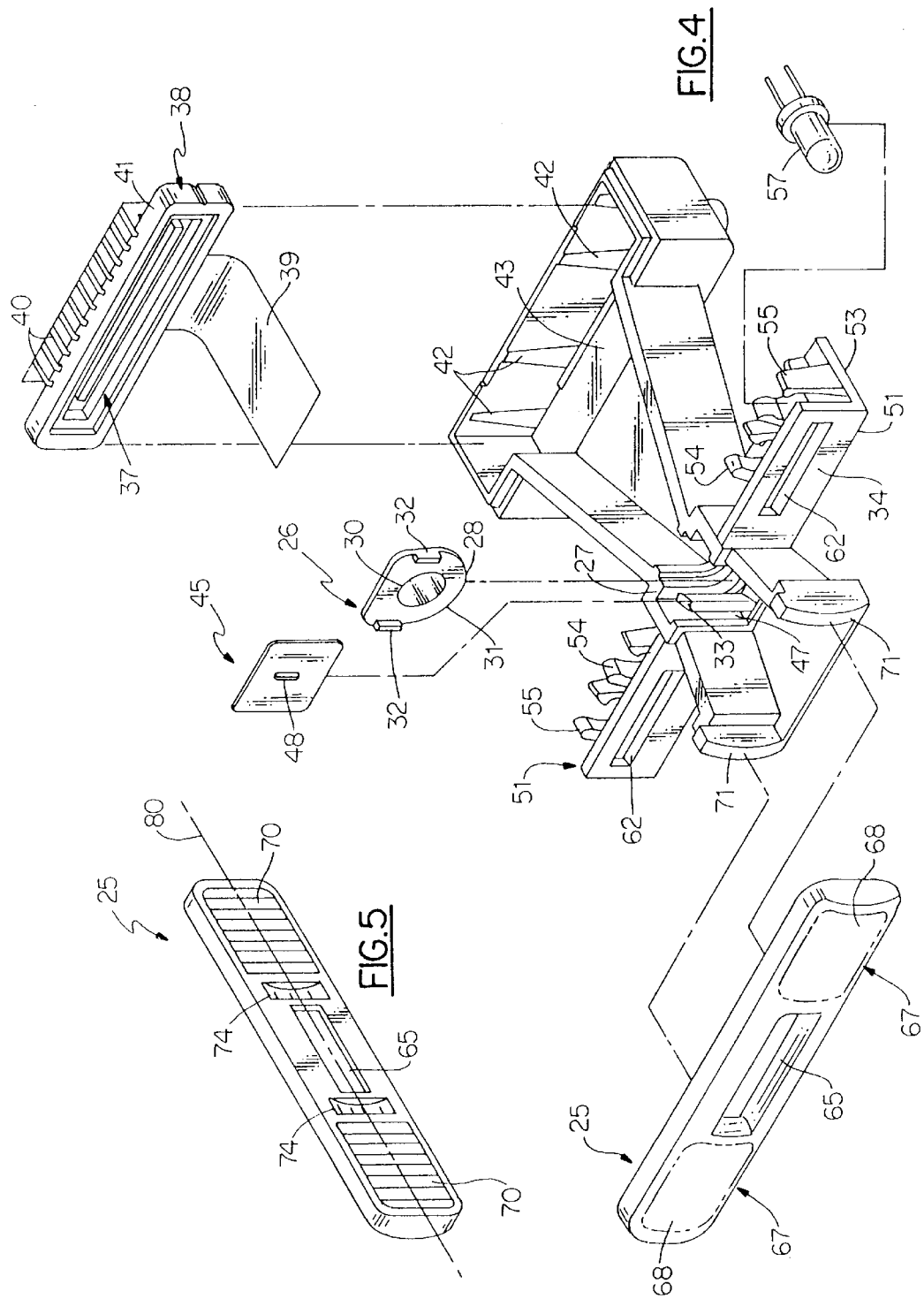

OPTICAL ASSEMBLY FOR BARCODE SCANNER

BACKGROUND OF THE INVENTION

This invention relates to an optical assembly for use in a barcode reader and, in particular, to an optical assembly that is capable of maximizing the light produced by a plurality of light emitting diodes to provide a high intensity image of a barcode target at the image recording surface of a solid state imager.

Although the advantages associated with light emitting diodes (LEDs) when used in barcode scanning equipment are well known, the level of the intensity produced by this type of lamp is relatively low when compared to other light sources such as halogen lamps or arc lamps. In an effort to improve the effectiveness of light emitting diodes in this application, it is sometimes customary to employ a relatively large number of lamps aligned in one or more rows above or below the imaging lens. As a result, the target region, as well as the periphery of the target region, are flooded with an excessive amount of light. This approach, however, is space consuming and poses certain assembly and alignment problems.

Optical units have also been devised for providing coplanar illumination wherein the light emitting diodes are mounted in the same plane as the imaging onto both sides of the imaging lens. The light from the light emitting diodes is further passed through magnifying lens to project the light onto the target region. Additionally, diffusers are used in association with the LEDs to more uniformly distribute the light within the target area. Here again, these optical units overcome many of the problems associated with LED illumination systems. They nevertheless pose certain other problems relating to bringing the components together in assembly to provide a compact, easy to install and adjust unit suitable for use in a hand-held long range scanner as opposed to a scanner that reads barcodes in contact.

SUMMARY OF THE INVENTION

It is, therefore, a primary object of the present invention to improve barcode readers.

A further object of the invention is to improve hand-held barcode scanners for long range illumination and reading of a barcode target.

A still further object of the present invention is to improve optical devices for use in barcode scanners which are capable of producing a sharply defined line of illumination in barcode space using light emitting diodes.

Another object of the present invention is to simplify the assembly of barcode readers using coplanar light emitting diode illumination systems.

Yet another object of the present invention is to provide a single molded frame for holding and positioning the components of a barcode reader.

Yet a further object of the present invention is to more effectively utilize the light emitted by LEDs in a barcode scanner.

These and other objects of the present invention are attained by means of an optical assembly for use in a barcode reader that includes a molded support frame having a rear housing and a pair of arms outwardly extending from the front of the housing. A solid state imager is contained in the housing and an imaging lens is slidably contained between the arms in a rear guideway for focusing an image in barcode space along an optical axis onto the image recording surface of the solid state imager. An aperture card is also slidably contained between the arms in a second front guideway. The aperture card has a vertically disposed stop aperture which is centered about the optical axis of the system. A lamp support unit is mounted on the arms on either side of the imaging lens. Each unit contains a pair of light emitting diodes that are in coplanar alignment with the imaging lens and a horizontally disposed field aperture positioned in front of the light emitting diodes. A single horizontally extended half cylinder optical element is mounted at the distal end of the two arms so that the optical element is centered upon the optical axis of the system with the plano surface facing the imaging lens in perpendicular alignment with the optical axis. An opening is formed in the center of the optical element through which an image of a barcode target can pass optically undisturbed. The outer ends of the optical element form cylindrical lenses for magnifying and focussing the light passing through the two stop apertures in barcode space. A single axis diffuser is positioned at the piano surface of each cylindrical lens which distributes the light from the LEDs horizontally and homogenizes the light across the barcode target area.

BRIEF DESCRIPTION OF THE DRAWINGS

For a better understanding of these and other objects of the present invention, reference will be made to the following detailed description of the invention which is to be read in association with the accompanying drawings, wherein:

FIG. 4 is a slightly enlarged exploded view in perspective of the present optical assembly; and FIG. 5 is a perspective view showing the back of the half cylinder element.

DESCRIPTION OF THE INVENTION

Figure 1:
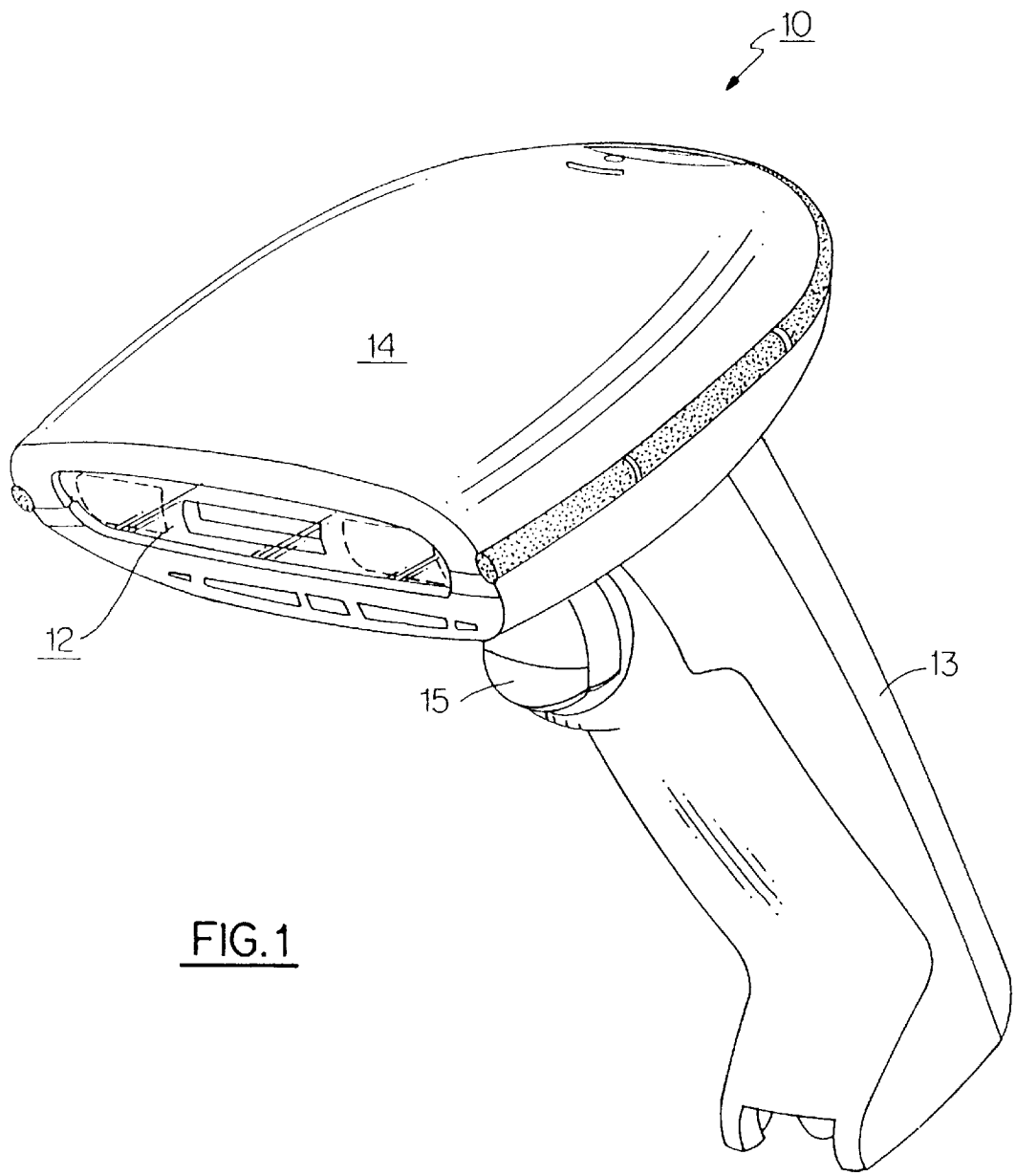
FIG. 1 is a perspective view of a hand-held barcode reader housing the optical assembly of the present invention.
Figure 2:
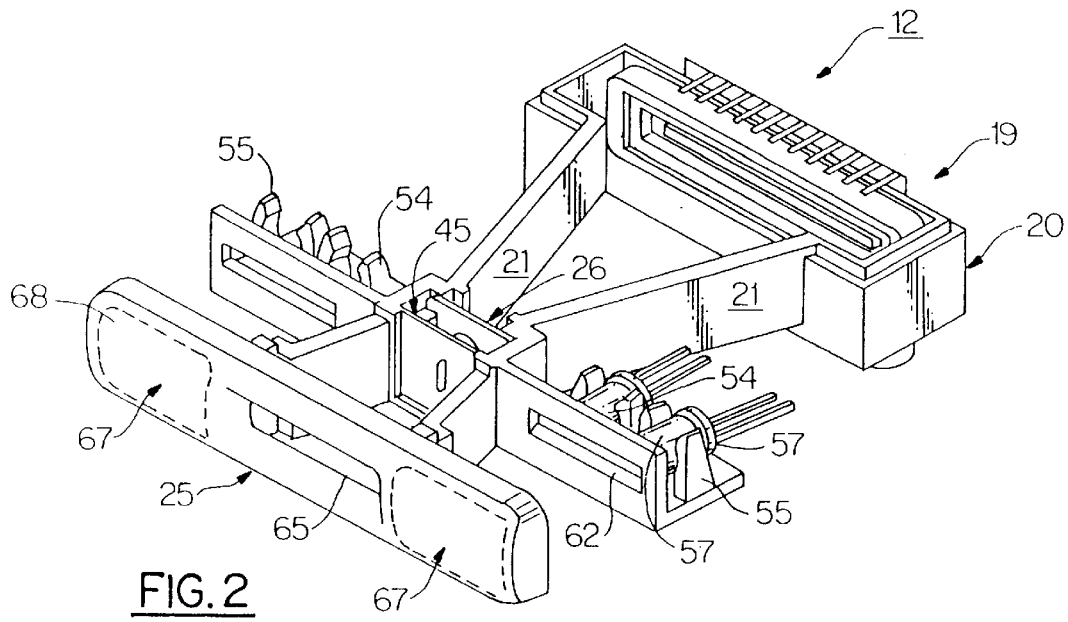
FIG. 2 is an enlarged perspective view showing the optical assembly encompassing the teachings of the present invention.

Turning initially to FIG. 1, there is shown a hand-held long-range barcode scanner 10 that houses the optical assembly 12 of the present invention. The scanner includes a handle 13 that can be easily grasped and held by the user so that the scanner can be rapidly trained upon a barcode target situated some distance from the user. The scanner further includes a contoured reader head 14 mounted on the top of the handle and a trigger 15 for activating the scanner. The scanner preferably is a light-weight, truly portable device that can be easily held and carried about without tiring the user. Accordingly, the reading components of the instrument must be compact, yet easily assembled, aligned and installed within the reader head. As will be explained in detail below, the apparatus of the present invention provides all these advantages while at the same time, delivering an extremely sharp, well-defined line of illumination in barcode space that can be accurately read by a solid state imager.

Figure 3:
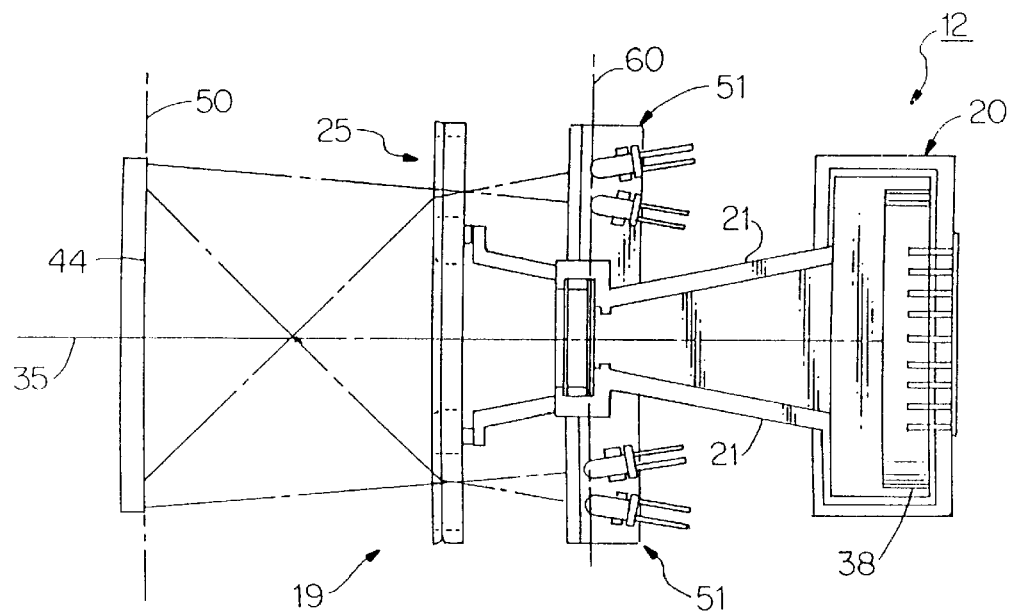
FIG. 3 is a top plan view of the optical assembly illustrated in FIG. 2.

With further reference to FIGS. 2–5, the optical assembly 12 embodying the teachings of the present invention includes a single piece frame 19 molded from high strength lightweight plastic. The frame further includes a rectangular-shaped housing 20 and a pair of forwardly extended arms 21—21. The arms, as viewed from above, in FIG. 3 are in an X configuration with an elongated optical element 25 mounted at the distal end of the arms, the function of which will be explained in greater detail below.

A lens card 26 (FIG. 4) is slidably received within a vertically disposed guideway 27 located at the neck formed by the arms. The lens card is molded from a single material and includes a flat lens holder 28 surrounding a single imaging lens 30. The bottom surface 31 of the holder is arcuate-shaped and adapted to seat within a complimentary groove situated in the bottom of the guideway. A pair of tabs 32—32 are carried on the front face of the lens holder which, in assembly, rests on the top surface of stanchions 33, which form the front rails of the guideway. The tab serves to locate the imaging lens within the frame and prevents the lens card from being inserted into the frame in an inverted position.

Once properly mounted in the frame, the imaging lens defines the optical axis 35 (FIG. 2) of the system. A solid state image sensor or imager 37, which preferably is a charge coupled device (CCD), is mounted within a support 38 and is coupled to a flexible ribbon connector 39 by a series of leads 40 mounted along the top apron 41 of the support. The support is passed downwardly into the housing against locating ribs 42—42 molded into the back wall of the housing, and is seated upon the floor 43 of the housing. The solid state imager is aligned within the housing so that it is centered upon the optical axis of the system a given distance from the imaging lens so that an image of a target 44 in barcode space is focused upon the image recording surface of the imager by the imaging lens. A system for mounting an image sensor in an imaging device is described in detail in a copending application entitled "Image Sensor Mounting System" filed concurrently herewith, assigned to the Assignee of the present invention, and incorporated herein by reference.

An aperture card 45 is slidably contained within a second guideway 47 positioned in front of the first guideway at the neck of the "X" shaped arms. The aperture card contains a vertically-extended stop aperture 48 that is centered upon the horizontal optical axis of the system. When the card is mounted in the guideway, the vertical orientated long dimension of the aperture is arranged so that the long dimension is parallel to the longer dimension of a one-dimensional (1D) barcode target situated in the object plane 50 of the imaging lens.

The terms horizontal and vertical are used herein with respect to relative locations of various components of the optical system and not necessary as to the exact location of the components in space.

A pair of lamp brackets 51—51 are mounted on either side of the frame at the neck. Each bracket is of similar construction and includes a platform 53 and a front wall 54. As best illustrated in FIG. 4 each platform has a pair of clips 54 and 55 mounted thereon that are perpendicularly aligned with the optical axis of the system. A light emitting diode (LED) 57 is mounted in each clip so that the distal end of each lamp lies substantially within the plane 60 (FIG. 3) described by the imaging lens to finish the system with what is known as coplanar illumination.

The front wall 34 of each lamp bracket contains a horizontally disposed field stop 62 that is positioned immediately in front of the LEDs preferably almost in contact with the lamps.

The elongated optical element 25 mounted at the distal end of the frame arms is shown in greater detail in FIGS. 4 and 5. The optical element is formed of an elongated semicircular shaped piece of optical glass having a rectangular-shaped opening 65 centrally formed therein. The opening is of a size and shape such that an image of a target in barcode space can freely pass optically undisturbed as it moves along the optical axis 35 of the system.

Cylindrical lens elements 67—67 are located on either side of the opening through which illumination from the LEDs pass. Each cylindrical lens images the field stop in barcode space to produce a sharp horizontal line of illumination at the target. A single axis diffuser 70—70 is located at the plano light entrance face of each cylindrical lens, which serve to homogenize the light in a horizontal plane and thus causes the light energy to be uniformly distributed within the target area. The diffuser can be either a gradient or a non-gradient diffuser. Preferably, a gradient diffuser is employed having 5° of diffusion at its outer edge, and 40° of diffusion at its inner edge.

The LEDs mounted in the inboard clips 54 of each lamp bracket is canted at an angle with respect to the optical axis so that the light beam from the lamps is directed to one outer side edge of the target region. The lamps mounted in the outboard clips 55 are similarly canted to direct the light beams from the outboard lamps toward the center of the target region. The positioning of the lamps along with the use of a single axis diffuser and a field stop apparatus serves to create a sharp uniform line of light across the barcode target that can be accurately recorded by the CCD imager.

As illustrated in FIG. 4, the distal end of each arm of the frame contains an arcuate-shaped camming surface 71 that lies in a vertical plane that is parallel with the optical axis of the system. The camming surfaces are received in complimentary cut-outs 74 formed in the plano back surface of the optical element 25 with the cut-outs being centered upon the center line of 80 of the optical element 25. Preferably, each camming surface describes arc segments of a circle about which the cylindrical illumination lenses carried by the elongated optical element 25 can be rotatably adjusted within the plane described by the arc segments. The center of curvature of the camming surfaces are coincident with the center of curvature of the front surface 68 of the optical element 67. Accordingly, the illuminator lenses can be adjusted about the arc segments so that the line of illumination that is produced is coincident with the object plane of the imaging lens. As can be seen, a slight rotation of the element about the camming surface will angularly offset the plano entrance face of the two cylindrical lenses with respect to the axis of the incoming light beam, thus altering the position of the line of light produced in the plane of the barcode target. Accordingly, during assembly of the optical reader components on the frame, the line of illumination can be easily and accurately adjusted in barcode space. Once adjusted the optical element is permanently locked in place by ultrasonically welding the optical element to the frame. Any other means for holding the optical element 25 in a desired position within the frame may be similarly employed without departing from the teachings of the present invention.

One example of an optical assembly suitable for use in a barcode reader involves a single element plastic lens having a focal length of approximately 30 mm.

The lens is positioned approx 39 mm in front of a linear array CCD, so an image of a target in barcode space is formed at the image plane of the lens at a magnification of approx 1/3.5×. The aperture stop of the lens can be either elliptical or rectangular in shape, having an aspect ratio of at least 3:1 and preferably 6.0 or 8:1. The longer dimension of the aperture is oriented vertically, so the long dimension of the aperture is parallel to the longer dimension of a 1D barcode. The CCD of choice is a chip developed specifically for barcode reading, the photosensitive elements (pixels) having a 25:1 aspect ratio. Again, the longer dimension of the pixels will be aligned parallel to the barcode.

The illumination system consists of four LEDs in standard T 13/4 packages. Two LEDs will be arrayed on either side of the imaging lens. The LEDs will lie in the same plane as the imaging lens, to provide coplanar illumination. In front of the LEDs, almost in contact with them, is a field stop. The field stop is simply a horizontal slit having a height of about 0.040 to 0.050". The field stop is imaged into barcode space by a cylindrical lens having a focal length of about 25 mm. The magnification of the cylinder lens is approx 6x, so the result is a sharp horizontal line, 0.24" to 0.36" in height. Also included in the illumination system is a single axis diffuser, located in contact with the cylinder lens. This diffuser serves to homogenize the light in the horizontal plane, improving the uniformity of the distribution of the light.

While this invention has been explained with reference to the structure disclosed herein, it is not confined to the details set forth, and this invention is intended to cover any modifications and changes as may come within the scope of the following claims:

What is claimed is:

1. An optical assembly for use in a reader having an optical axis that includes
    a support frame having a rear housing containing a solid state imager,
    an single imaging lens mounted in said frame for focusing a target image upon said solid state imager along a linear optical axis, an illumination unit mounted in coplanar alignment on each side of said frame,
    each unit containing at least one lamp mounted behind a field stop aperture, and
    a cylindrical illumination lens mounted in front of each field stop aperture for focussing a horizontal line of light upon a target in barcode space, wherein the cylindrical lenses are contained within an elongated, semi-circular optical element that passes perpendicularly across said optical axis of said optical element having a central opening therein through which a target image can pass undisturbed.

2. The optical assembly of claim 1, wherein each cylindrical lens further includes a single axis diffuser for uniformly distributing light across a target.

3. The optical assembly of claim 1, wherein each illumination unit contains at least two side-by-side light emitting diodes.

4. The optical assembly of claim 3, wherein at least two light emitting diodes contained in each illumination unit are angularly offset one from the other to more uniformly illuminate the entire target.

5. The optical assembly of claim 4 wherein said imaging lens and said light emitting diodes lie in a common plane.

6. The optical assembly of claim 2, wherein said diffuser is a single axis gradient diffuser.

7. The optical assembly of claim 1 wherein said frame further includes a rear guideway that removably supports an optical card containing the imaging lens.

8. The optical assembly of claim 7 wherein said frame further includes a front guideway and an aperture card removably supported in said front guideway, said aperture card containing a stop aperture that is centered upon the optical axis of the system.

9. The optical assembly of claim 8 wherein said stop aperture is elongated in a vertical direction.

10. The optical assembly of claim 6 wherein each diffuser has 40° of diffusion along one side edge nearest the optical axis of the system, and 5° of diffusion along the opposite side edge.

* * * * *